April 26, 1955 M. C. WILLS ET AL Re. 23,989

DITCHER HAVING SLIDABLE BOOM SUPPORTED BUCKET CONTROL MEANS

Original Filed April 14, 1952

INVENTORS
Marion C. Wills
Wayne J. Wills
BY
ATTORNEY

United States Patent Office

Re. 23,989

Reissued Apr. 26, 1955

23,989

DITCHER HAVING SLIDABLE BOOM SUPPORTED BUCKET CONTROL MEANS

Marion C. Wills and Wayne J. Wills, Topeka, and Evan E. Dorkins, Ottawa, Kans.; said Dorkins assignor to said Marion C. Wills and Wayne J. Wills Original No. 2,669,367, dated February 16, 1954, Serial No. 282,233, April 14, 1952. Application for reissue December 7, 1954, Serial No. 473,772

3 Claims. (Cl. 214—138)

Matter enclosed in heavy brackets [ ] appears in the original patent but forms no part of this reissue specification; matter printed in italics indicates the additions made by reissue.

This invention relates to improvements in earth-handling equipment, and has for its primary object to improve upon the "ditching attachment for tractors," forming the subject matter of our co-pending application, Serial No. 195,928, filed November 16, 1950, this being a continuation-in-part of said co-pending application.

It is the primary object of this invention to provide a ditching machine including a boom upon which is swingably mounted an earth-handling bucket or dipper, there being included within the concepts hereof, novel means for imparting swinging movement to the bucket and including a slide mounted upon the boom itself.

Another important object of this invention is to provide actuating means for swingable buckets forming a part of ditching machines or other earth handling equipment having tremendous power and being subject to little wear or other operating difficulties, and consisting of a member reciprocable longitudinally of the boom itself and operably connected with the swinging bucket through pivotal linkage.

A still further object of this invention is to provide bucket-control means as just above set forth, including hydraulic mechanism for sliding the control member longitudinally of the boom upon which it is mounted, the hydraulic means being disposed so as to impart direct thrust and pulling energy upon the slide member without the lost motion that becomes necessary when such actuating means is rendered swingable.

Other objects hereof include the way in which there is provided a swingable boom adapted to be moved on a plurality of axes; the way in which the dipper control means is mounted on the boom for movement therewith; the manner of including a bucket arm depending from the boom and swingable through connection with the arm itself below its pivotal connection with the boom; and many other more minor objects, all of which will be made clear as the following specification progresses.

Figure 1:
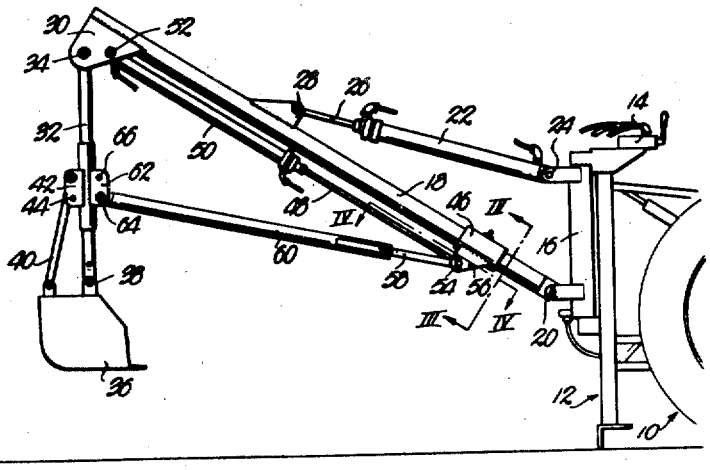
Figure 1 is a side elevational view of a ditcher having slidable boom-supported bucket control means made pursuant to our present invention.
Figure 2:
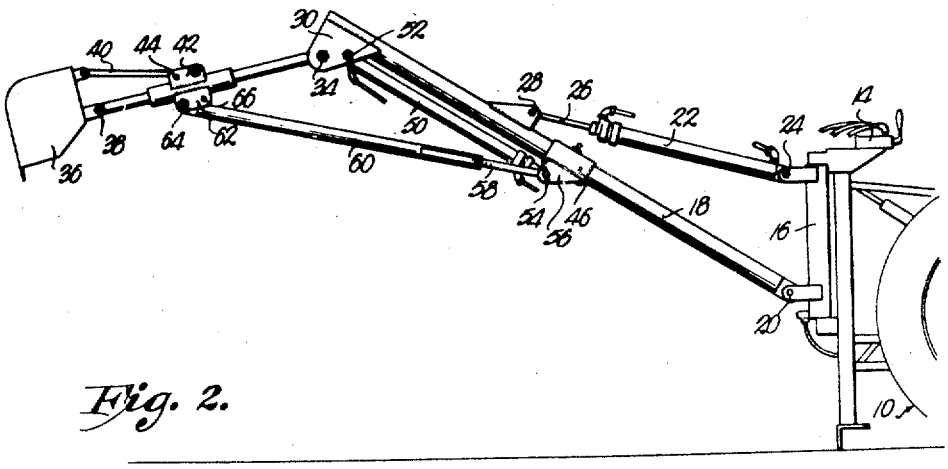
Fig. 2 is a side elevational view illustrating the position of the various parts when the bucket is in a dumping position.

As in our co-pending application above identified, the ditching assembly hereof is adapted to be mounted upon a tractor shown fragmentarily only in the drawing and designated broadly by the numeral 10. A frame 12 rests directly upon the ground as shown in Figs. 1 and 2 when the apparatus hereof is in use, said frame 12 being operably connected with the power-lift mechanism of tractor 10 for elevation, and therefore, for support by the tractor 10 during transfer from one point of use to another.

Frame 12 has the valving mechanism 14 for controlling various hydraulic motivating means hereinafter to be set forth, so mounted thereon as to be readily accessible to the operator of tractor 10.

A vertical member 16 is carried by the frame 12 for rotation on a substantially vertical axis whereby to impart swinging movement to all parts hereinafter to be described, through substantially a 180 degree arc. Hydraulic means, not herein illustrated, operably interconnects the member 16 and the frame 12 for imparting such swinging movement.

The rotative tubular member 16 carries an elongated boom 18 by pivotal connection 20, swinging movement of boom 18 on the horizontal axis 20, being accomplished by means of an hydraulic cylinder 22 having a double-acting reciprocable piston therein. Cylinder 22 is pivotally secured to the rotative member 16 by means of a pivot pin 24. The piston within cylinder 22 has an elongated stem 26 pivotally joined to the boom 18 intermediate the ends of the latter by a pivot pin 28. A bracket 30 on the outermost free end of the boom 18, remote from pivot point 20, consists of a pair of opposed, spaced plates not herein illustrated, between which is disposed a dipper arm 32. The uppermost end of the dipper 32 is pivotally secured to the bracket 30 by a bolt or the like 34. Swingable arm 32 has a bucket or dipper 36 secured to the lowermost end thereof preferably by a pivot pin 38. One manner of providing adjustability of the bucket 36 with respect to arm 32, includes the utilization of a link 40 connecting the bucket 36 and the arm 32 intermediate the ends thereof by means of a bracket 42. A plurality of openings 44 in the bracket 42 permit adjustment of the link 40. Such is the means disclosed in our co-pending application above identified.

Alternate means for so adjusting the bucket 36 with respect to arm 32, are disclosed in our co-pending applications filed on even date herewith and entitled "Dipper Control for Ditching Machines."

Figure 3:
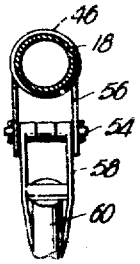
Fig. 3 is a detailed, cross-sectional view taken on line III—III of Fig. 1.

In lieu of the means disclosed in our application, Serial No. 195,928, for swinging the arm 32 with respect to the boom 18, there is herein provided a slide member or collar 46 on the boom 18. The collar 46 surrounds the boom 18 as shown in Fig. 3 of the drawing, and is adapted for reciprocation longitudinally of boom 18 as limited by the extensibility of a piston stem 48 for hydraulic cylinder 50.

Figure 4:
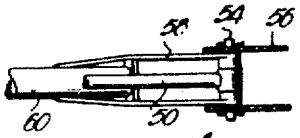
Fig. 4 is a fragmentary, detailed, cross-sectional view taken on line IV—IV of Fig. 1.

In this connection, it is manifest that any type of cylinder-piston assembly may be used for all of the hydraulic controls hereof, but by way of further explanation, reference may be had to a novel hydraulic cylinder forming the subject matter of our co-pending application filed on even date herewith particularly adapted for this use. The cylinder 50 is joined to the bracket 30 as at 52 and the stem 48 has connection with the collar 46 by means of a pivot pin 54. It is noted in Fig. 4 of the drawing that collar 46 has a pair of depending ears 56 between which the stem 48 is disposed. The ears 56 also embrace a pair of extensions 58 on an elongated link 60 that is pivotally joined to a bracket 62 by pivot pin 64. Bracket 62 is in opposed relationship to the bracket 42 on arm 30 and is likewise provided with a number of openings 66 for adjustably receiving the proximal end of link 60. Pivot pin 54 serves therefore, not only to pivotally receive the piston stem 48, but the connecting link 60.

It is apparent that sliding movement of the collar 46 along the longitudinal axis of the boom 18 upon which it is slidably mounted, imparts swinging movement to the arm 32 through link 60. Retraction of the stem 48 into the cylinder 50 as controlled from unit 14, moves the collar 46 upwardly along the boom 18 toward the uppermost end of boom 18, thereby swinging arm 32 upwardly and moving the bucket 36 to a dumping position as shown in Fig. 2 of the drawing. Extension of the stem 48 shifts the collar 46 toward the pivot point 28, thereby imparting a pulling force to the arm 32 through link 60, thereby forcing the bucket 36 into the earth or other material to be handled thereby.

The entire assembly for controlling the bucket 36 being mounted on the boom 18, can, without effecting the relative position of bucket 36, be swung not only on the horizontal axis 20, but on the vertical axis of the rotative member 16. While cylinder 50 and the stem 48 are both pivotally secured to the boom 18 and to the collar 46 respectively to avoid any jamming whatsoever, the force that is applied to slide member 46 is straightforward, and therefore, extremely powerful as compared with actuation that includes swinging of the hydraulic assembly.

Other advantages resulting from the use of control means of this character will become apparent to those skilled in this field, and therefore, such uses as fairly come within the spirit of this invention as defined by the appended claims, are contemplated hereby.

Having thus described the invention what is claimed as new and desired to be secured by Letters Patent is:

1. In a material handling machine, a support; an elongated boom; means swingably mounting the boom on the support; structure interconnecting the support and the boom for raising and lowering the same; an arm [swingably secured]; *pivot means swingably securing the arm* to the boom; a dipper on the arm; a reciprocable member on the boom separate from said structure; [and] means connecting the member and the harm for swinging the dipper as the member is reciprocated, said means comprising a link having pivotal connection with said member and with said arm; *and power means interposed between said pivot means and said member and operably interconnecting the boom and the member for reciprocating the latter.*

2. In a material handling machine, an elongated boom; an arm swingably secured to the boom; a dipper on the arm; a member mounted on the boom for reciprocation along the longitudinal axis thereof; means connecting the member and the arm for swinging the dipper as the member is reciprocated; and an extensible device interconnecting the member and the boom for reciprocating the member.

3. In a material handling machine, an elongated boom; an arm swingably secured to the boom; a dipper on the arm; a member mounted on the boom for reciprocation along the longitudinal axis thereof; means connecting the member and the arm for swinging the dipper as the member is reciprocated; and an extensible device interconnecting the member and the boom for reciprocating the member, said means comprising a link having pivotal connection with said member and with said arm, said device including a hydraulic cylinder having a double acting, reciprocable piston therein.

References Cited in the file of this patent or the original patent

UNITED STATES PATENTS

| | | |
|---|---|---|
| D. 162,873 | Pilch | Apr. 10, 1951 |
| 1,489,042 | Pugh | Apr. 1, 1924 |
| 2,470,147 | Cramer | May 17, 1949 |
| 2,678,140 | Goetz | May 11, 1954 |